May 19, 1931.    E. BROWN    1,806,328
GEAR POWER TRANSMISSION
Filed Feb. 16, 1929
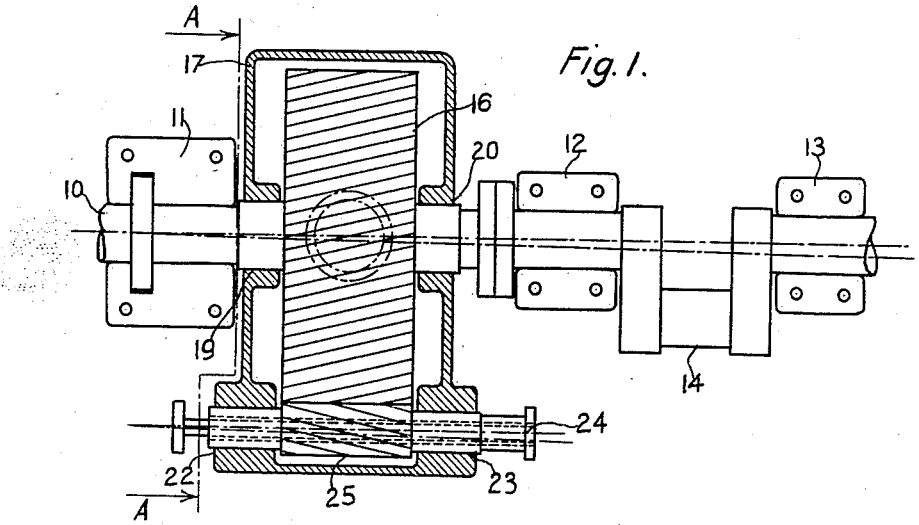
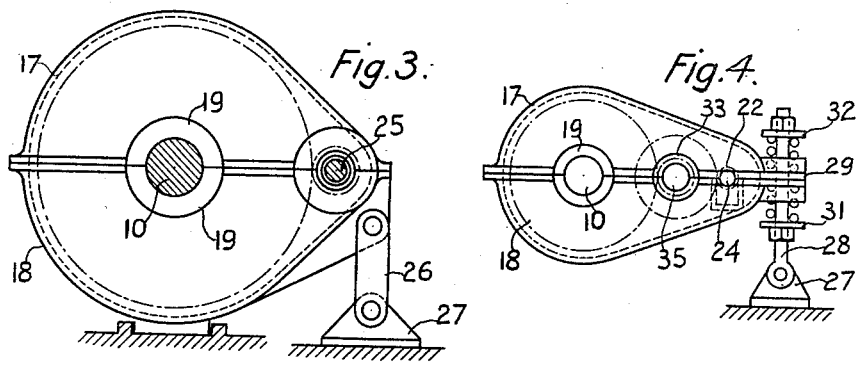
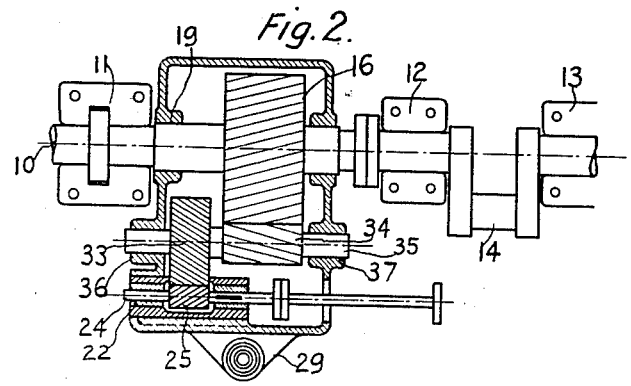
Inventor
Eric Brown
By (signature)
Attorney Patented May 19, 1931

1,806,328

UNITED STATES PATENT OFFICE

ERIC BROWN, OF BADEN, SWITZERLAND

GEAR POWER TRANSMISSION

Application filed February 16, 1929, Serial No. 340,548, and in Germany March 12, 1928.

This invention relates to means for transmitting the power produced by a reciprocating and a rotary prime mover to a common shaft and, more particularly, to such combination of prime movers when applied to ship propulsion installations.

Any installations including a reciprocating prime mover or engine and a rotary prime mover such as a turbine, coupled to a common shaft such as a propeller shaft, one of the prime movers must be connected to the shaft by gearing to avoid disturbances in the operation of the prime movers when the shaft is out of alignment. Such gear connection, as is usual, includes a driven gear attached to the propeller shaft and a driving gear or pinion connected with the shaft of the prime mover. When such installation is used, especially when used for ship propulsion, the gears must be so arranged as to provide for a ready meshing of the gear teeth under all operating conditions, such as bending of the foundation or increasing wear on the shaft bearings which would throw the shaft out of alignment, and thereby destroy the parallelism of the axes of the gears. The axes of the gears must remain parallel under all conditions to avoid tooth overloads, especially when the direction of motion is reversed, due to the inertia of the rapidly rotating turbine rotor which is commonly of considerable mass.

It is, therefore, among the objects of the present invention to provide a gear transmission for power from one prime mover to a shaft receiving power from a second prime mover coupled directly thereto.

Another object of the invention is to provide a gear transmission for structures of the character described in which the gears will mesh evenly under all operating conditions.

A further object of the invention is to provide gearing for use as above described in which the axes of the several gears are always maintained in parallelism.

Objects and advantages, other than those above set forth, will be apparent from the following description of the drawings, in which Fig. 1 is a view showing the upper portion of a housing enclosing the gears removed; and, Fig. 2 is a view, similar to that shown in Fig. 1, showing a modified form of the gear transmission; and, Fig. 3 is an end elevational view taken on the line A—B of Fig. 1; and, Fig. 4 is a view similar to that shown in Fig. 3, showing a modified means for preventing rotation of the gear housing.

Referring more particularly to the drawings by characters of reference, the reference numeral 10 indicates a shaft which may be a ship's propeller shaft or any other shaft, for transmitting power to the point at which it is to be used. The shaft 10 is supported in the bearings 11, 12, and 13 and is formed with a crank 14 to which a reciprocating engine (not shown) is arranged to be connected. A gear 16 is attached to the shaft 10 between the bearings 11 and 12 for rotation therewith and is inclosed within a housing divided into several portions 17 and 18. The housing portions 17 and 18 are provided with bearings 19 and 20 for contact with the shaft 10 and are further provided with bearings 22 and 23 at a point adjacent the periphery of the housing. The bearings 22 and 23 are arranged to receive a shaft 24 having a driving gear or pinion 25 secured thereon, which shaft is arranged to be connected either directly or indirectly to a second prime mover, such as a steam turbine. The pinion gear 25 and the driven gear 16 are so arranged as to be in mesh with each other for the purpose of permitting transmission of power from the second prime mover or turbine (not shown) to the shaft 10. The bearings 22 and 23 for the pinion being arranged in the housing of the driving gear are maintained in the same relation therewith regardless of any bending or flexing of the foundation, so that the axes of the main shaft 10 and the driving or pinion gear shaft 24 are continually maintained in parallel. Upon the occurrence of any bending or flexing in the foundation, changing the relative positions of the prime movers, the second prime mover or turbine, which may be directly connected to the pinion shaft 24, may change its relative position without varying the relations of the several gears. If desired, the bearings 22, 23, for shaft 24 carrying gear 25, may be so arranged as to oscillate in the plane of the greatest variation of shaft 10.

Rotation of the housings about the shaft 10 is limited by a link 26 secured to the housing at one end and to a bracket 27, extending from the foundation, at the other end. Rotation of the housing may also be limited by a use of a projection integral with the housing and engaging extensions from the foundation arranged on either side thereof or by the use of a threaded rod 28 extending from the bracket 27 secured to the foundation and passing through an extension 29 of the housing with springs 31 and 32 on either side of the extension 29 about rod 28, for the purpose of resiliently taking up any tendency toward excessive rotation which might possibly occur in the use of the invention.

The single gear transmission above described may also be replaced by a double gear transmission in which the bearings for the shaft carrying the intermediate gears are also formed in the portions of the housing, as is shown in Fig. 2 in which the intermediate gears 33 and 34 are mounted on the shaft 35 rotating in bearings 36 and 37.

It will be apparent from the above description that the invention maintains the axis of the bearings of the pinion of a gear transmission from one prime mover to a shaft directly connected with another prime mover in such parallelism with the axis of the driven gear that the teeth of the gears will be continually maintained in the same relation.

It will be seen further that any variation in the relative position of the two prime movers will be without effect on the transmission of power to the common shaft, for the reason that any such variation produces variation in the position of the gear wheel assembly without disturbing the parallelism of the axes thereof.

Although only a few embodiments of the invention have been illustrated and described, it will be understood that various other embodiments are possible, and that various changes may be made without departing from the spirit of the invention or the scope of the claims.

The invention claimed is:

1. In means for transmitting power from a plurality of prime movers, a main shaft having one of the prime movers connected directly thereto, a gear attached to said shaft, a pinion gear for driving said first-mentioned gear, said pinion being connected with a second prime mover and having the axis thereof so supported as to be maintained in parallel with the axis of said first-mentioned gear, and means for supporting said pinion in dependence on the position of said shaft.

2. In means for transmitting power from a plurality of prime movers, a shaft having one of the prime movers connected directly thereto, a gear attached to said shaft, a housing rotatably arranged on said shaft and inclosing said gear, said housing having bearings formed therein, a gear connected with a second prime mover and supported in the bearings in said housing, and means for limiting the movement of said housing.

3. In means for transmitting power from a plurality of prime movers, a shaft arranged for direct connection to one of the prime movers, a gear secured on said shaft, a housing movably supported on said shaft and inclosing said gear, the position of said housing being dependent on the position of said shaft, and a driving pinion gear rotatably supported in said housing to mesh with said gear, the driving actuation of the said pinion being responsive to the operation of another of said prime movers.

4. In means for driving ship's propeller shafts from a plurality of prime movers, a propeller shaft having a prime mover connected directly thereto, a driven gear fixed on said shaft, a movable housing for said gear supported entirely upon and positioned by said shaft, and driving gearing operated by another of the prime movers and arranged to engage with said driven gear, said gearing being rotatably supported only by said housing.

In testimony whereof I have hereunto subscribed my name this 4th day of February, A. D. 1929.

ERIC BROWN.